United States Patent
Kitada et al.

(10) Patent No.: US 7,495,058 B2
(45) Date of Patent: Feb. 24, 2009

(54) WATER-BASE COATING MATERIAL

(75) Inventors: Mitsuru Kitada, Osaka (JP); Kazuo Kuba, Osaka (JP); Toshifumi Tamaki, Osaka (JP)

(73) Assignee: Dainippon Ink and Chemicals, Inc., Tokyo (JP)

( * ) Notice: Subject to any disclaimer, the term of this patent is extended or adjusted under 35 U.S.C. 154(b) by 256 days.

(21) Appl. No.: 10/552,251

(22) PCT Filed: May 20, 2004

(86) PCT No.: PCT/JP2004/007205

§ 371 (c)(1),
(2), (4) Date: Oct. 4, 2005

(87) PCT Pub. No.: WO2004/106432

PCT Pub. Date: Dec. 9, 2004

(65) Prior Publication Data

US 2006/0217497 A1 Sep. 28, 2006

(30) Foreign Application Priority Data

May 28, 2003 (JP) ............................... 2003-150608

(51) Int. Cl.
C08F 283/04 (2006.01)
C08F 63/00 (2006.01)
C08L 75/04 (2006.01)
B32B 27/40 (2006.01)

(52) U.S. Cl. .................................. 525/453; 525/440.01

(58) Field of Classification Search ................. 524/591, 524/590; 525/453, 460, 440.01
See application file for complete search history.

(56) References Cited

U.S. PATENT DOCUMENTS

| | | | | | |
|---|---|---|---|---|---|
| 3,960,983 A | * | 6/1976 | Blank | .......................... | 525/496 |
| 5,194,487 A | * | 3/1993 | Jacobs | ........................ | 524/591 |
| 5,308,914 A | * | 5/1994 | Wallon et al. | ............... | 524/591 |
| 6,187,524 B1 | * | 2/2001 | Park | ........................... | 430/531 |
| 6,194,061 B1 | * | 2/2001 | Satoh et al. | ................. | 428/341 |
| 2001/0031363 A1 | | 10/2001 | Traubel et al. | | |
| 2002/0077413 A1 | * | 6/2002 | Kitada et al. | ................. | 524/590 |
| 2006/0148970 A1 | * | 7/2006 | Kuba et al. | ................... | 524/507 |

FOREIGN PATENT DOCUMENTS

| | | |
|---|---|---|
| JP | 61-228030 | 10/1986 |
| JP | 63-14748 | 4/1988 |
| JP | 5-230364 | 9/1993 |
| JP | 5-263060 | 10/1993 |
| JP | 8-22900 | 3/1996 |
| JP | 2000-26798 | 1/2000 |
| JP | 2000-108262 | 4/2000 |
| JP | 2001-49164 | 2/2001 |
| JP | 2001-277438 | 10/2001 |
| JP | 2003-277601 | 10/2003 |

OTHER PUBLICATIONS

JP2003277601 machine translation.*
JP2003277601 abstract.*

* cited by examiner

*Primary Examiner*—Mark Eashoo
*Assistant Examiner*—Noah Frank
(74) *Attorney, Agent, or Firm*—Edwards Angell Palmer & Dodge LLP

(57) ABSTRACT

Disclosed is an aqueous coating agent comprising a water dispersion (C) prepared by dispersing resin particles containing a water-dispersible polyurethane resin (A) and at least one compound selected from a hydrophobic polyester polyol (B-1) and a hydrophobic polyether polyol (B-2) in water, and a crosslinking agent (D) capable of reacting with a hydroxyl group, wherein the water-dispersible polyurethane resin (A) is obtained by reacting a polyester polyol (a-1), which is obtained by condensing a dicarboxylic acid containing an aromatic dicarboxylic acid as a main component with a polyol, with a polyisocyanate, and also contains 15 to 35% by weight of an aromatic cyclic structural unit, and wherein the hydrophobic polyester polyol (B-1) and/or the hydrophobic polyether polyol (B-2) are liquid at normal temperature and contain 20 to 50% by weight of an aromatic cyclic structural unit.

15 Claims, No Drawings

WATER-BASE COATING MATERIAL

TECHNICAL FIELD

The present invention relates to an aqueous coating agent. More particularly, the present invention relates to an aqueous coating agent that can be applied as primer coating agents which are used for the purpose of modifying the surface of plastic films made of polyester resin, polypropylene resin and polyamide resin thereby to impart excellent adhesion; anchor coating agents which are used for the purpose of improving adhesion to an aluminum deposit layer of an aluminum-deposited plastic film in the production of the aluminum-deposited plastic film; coating compositions, inks; and surface treating agents for fibers and leathers.

This application claims priority from Japanese Patent Application No. 2003-150608, filed on May 28, 2003, the disclosure of which is incorporated by reference herein.

BACKGROUND ART

Biaxially oriented polyester films (for example, polyethylene terephthalate films, which are commonly referred to as PET films) have widely been used in the fields of insulating materials, drafting and photographic films, magnetic tapes, vacuum metalized films and various packaging materials because they are excellent in electrical insulating properties, transparency, dimensional stability and toughness.

However, these biaxially oriented polyester films are insufficient in adhesion of the surface because molecular chains of the resin constituting the films are highly oriented and are therefore inferior in adhesion to a printing ink, magnetic coating composition, deposited metal or adhesive which is applied on the films.

In order to improve adhesion to the printing ink by activating the surface of the polyester film, the surface of the films is commonly subjected to a corona treatment, ultraviolet irradiation treatment, plasma treatment or flame treatment. Although adhesion can be improved by these treatments, the activity deteriorates with time. Therefore, means for activation of the surface of these films is not necessarily satisfactory.

As the other method of improving adhesion of the film surface, there is suggested an etching method of swelling or dissolving the surface using chemicals such as acid, alkali, trichloroacetic acid and phenols. This method enables decomposition and dissolution of crystal orientation in the vicinity of the film surface and also deteriorates cohesiveness thereby to improve adhesion, thus ensuring the effect. However, some of these chemicals are harmful and involve some risk upon handling.

As a method similar to this method, there is suggested a method of previously forming a thin coating layer (which is referred to as a primer layer, anchor layer or undercoat layer) made of the material, which is different from that of a base material, on a film using a coating agent which is referred to as a primer coating agent or anchor coating agent.

There has been used a method of applying a solvent-based coating agent prepared by dissolving in an organic solvent on a surface layer of a film in the prior art, however, an aqueous coating agent (which is referred to as an aqueous primer coating agent or aqueous anchor coating agent) has commonly been used, recently, for reasons of safety and sanitation. Particularly, an aqueous polyurethane resin composition having excellent adhesion to various base materials has been studied as the aqueous coating agent.

Plastic films comprising a coating layer made of the aqueous coating agent are used for various purposes. Among these plastic films, a polyester film is widely used as a food packaging film because of its excellent transparency and toughness. In these purposes, polyester film is not usually used by itself and there is commonly used a laminated film obtained by printing on a plastic film and laminating the plastic film with various films using an adhesive. Therefore, processability during printing or lamination under various conditions as well as excellent durability are required for the plastic film comprising the coating layer formed thereon. Since various compositions such as solvent-based resin composition and aqueous resin composition are used as the ink and adhesive to be coated on the coating layer formed on the plastic film, excellent solvent resistance, water resistance and heat resistance are required for the coating layer formed on the plastic film. To respond to these demands, the aqueous coating agent is commonly used in combination with various crosslinking agents.

Recent diversification in the film has required various functions for the film. Particularly, plastic films comprising a coating layer made of polyvinylidene chloride or a deposit layer made of aluminum formed for the purpose of improving gas barrier performances of a packaging material are used as a composition of the packaging material. In that case, a method of previously applying a coating agent on the surface of a plastic to form a coating layer is used for the purpose of improving adhesion to the layer made of polyvinylidene chloride or aluminum deposit. To impart excellent gas barrier performances, such a coating layer must be uniformly formed. This requires that the coating agent can be applied to various coating methods and can always form a uniform coating layer even under various conditions.

As the method of applying a coating agent on the plastic film, there are employed an in-line coating method of applying a coating agent during the biaxial stretching step in the manufacturing process of a plastic film and performing the lateral stretching step, and an off-line coating method of applying a coating agent to the taken-up plastic film performing the biaxial stretching step, and drying the coating agent to form a coating layer.

In the in-line coating method, since the coating agent is applied before crystal orientation is completed during the biaxial stretching step of the plastic film, adhesion between the base film and the coating layer is improved. In case of a PET film, the stretching step is further performed at the temperature of 150° C. or higher after applying the coating agent. In that case, reaction with the coating agent and crosslinking agent is so fast, and the coating layer cannot conform to the base material during the stretching step, and thus cracking occurs in the coating layer.

In the off-line coating method, since dimensional stability of the base material must be maintained, the drying step is commonly performed at a low temperature of 100° C. or lower. Therefore, a solvent-based coating agent capable of forming a hard and uniform coating layer at low temperature was used. However, it is not preferable in view of safety and problems such as environmental pollution and thus it is required to develop an aqueous coating agent which can also be applied to the off-line coating method.

Various suggestions have been made as a measure to counter these problems.

For example, there is disclosed that an aqueous resin composition comprising an aqueous polyester-urethane resin having a pendant carboxyl group neutralized with ammonia or organic amine in a high-molecular weight compound obtained from a polyester polyol having an aromatic cyclic structure and a polyisocyanate compound can provide a primer coating agent which is excellent in water resistance and blocking resistance (see, for example, Patent Document 1).

According to this method, a hard aqueous polyurethane resin can be obtained by using a polyester having an aromatic cyclic structure. Because of high glass transition temperature of a polyurethane resin, the film forming process at high temperature is required in order to obtain a uniform coating layer.

Actually, various crosslinking agents are often used in combination for the purpose of improving solvent resistance and heat resistance of the coating layer. In that case, there arises a problem that an uniform coating layer is hardly formed because of poor conformability to the base material during the stretching step of the film in the in-line coating method.

For the purpose of solving such a problem and forming a uniform coating layer, there is employed a method of plasticizing a resin as a main component in a coating agent by using an organic solvent having a high boiling point as a film forming agent.

In the method of using the film forming agent, for example, there is suggested a polyurethane emulsion coating agent composition wherein MFT (Minimum Film Forming Temperature) is lowered and film forming properties at normal temperature or lower temperature are improved by using an oxyalkylene glycol derivative having a boiling point of 80 to 270° C., which is a hydrophilic fusing agent, as the film forming agent (see, for example, Patent Document 2).

There is suggested a vacuum metalized polypropylene film wherein adhesion to a base material is improved by using a water-soluble organic solvent such as N-methyl-2-pyrrolidone as a film forming agent and mixing it with a polyesterurethane resin (see, for example, Patent Document 3).

However, these methods using the organic solvent have problems, for example, harmfulness to the human body and poor safety such as inflammation, and therefore it is required to develop a coating agent which contains no organic solvent and is excellent in film forming properties at lower temperature. Also in case of modifying the surface of plastic films having poor adhesion such as polypropylene, nylon and polyester films, it has been required to develop a coating agent which is excellent in adhesion between the coating agent and the base material.

When using the organic solvent as the film forming agent, there arises a problem that the film forming agent remains in the coating film and thus surface hardness decreases and wear resistance and blocking resistance deteriorate in case drying conditions at comparatively low temperature of 100° C. or lower are required, like the off-line coating method, and also there arises a problem that the water resistance deteriorates if the coating film is not sufficiently dried because the film forming agent has high hydrophilicity.

As the method of improving adhesion while maintaining heat resistance, there is suggested an aqueous polyurethane dispersion which is obtained by adding a polymer for improving adhesion to a polyurethane resin and dispersing the mixture in water (see, for example, Patent Document 4).

In this aqueous dispersion, a trial of improving adhesion and heat resistance is made by adding a resin having a softening temperature of 80 to 130° C., as a polymer for improving adhesion, to a polyurethane resin. When the aqueous dispersion by means of such a method is applied to the in-line coating method, conformability to the base material during the stretching step deteriorates, and thus it is difficult to obtain a uniform film free from coating film defects. When applied to the off-line coating method at lower processing temperature, the aqueous dispersion has poor film forming properties, and thus it is difficult to obtain a uniform film free from coating film defects.

(Patent Document 1) Japanese Patent Application, Second Publication No. Hei 8-22900 (page 1, left column to page 2, right column)

(Patent Document 2) Japanese Patent Application, Second Publication No. Sho 63-14748 (page 1, left column to page 2, right column)

(Patent Document 3) Japanese Patent Application, First Publication No. 2000-108262 (page 2, left column, claim 1 to page 2, right column, paragraph "0005")

(Patent Document 4) Japanese Patent Application, First Publication No. Hei 5-230364 (page 1, left column to page 2, right column)

DISCLOSURE OF THE INVENTION

An object of the present invention is to provide an aqueous coating agent which has excellent film forming properties without using a film forming agent comprising an organic solvent even when applied at a comparatively low temperature such as normal temperature, and also can form a coating layer which is excellent in adhesion to a base material, especially a polyester film.

Another object of the present invention is to provide an aqueous coating agent capable of forming a coating layer which is excellent in conformability to film deformation and does not cause cracking during the following stretching step even when applied during the film stretching step in the in-line coating method where processing is performed at high temperature of 150° C. or higher.

The present inventors have intensively studied so as to achieve the above objects and found that film forming properties during the application at comparatively low temperature can be improved and good film forming properties can be obtained in the off-line coating method by using an aqueous coating agent comprising a water-dispersible polyurethane resin having an aromatic cyclic structure, a water dispersion prepared by dispersing resin particles containing a polyester polyol or polyether polyol, which is liquid at normal temperature, in water, and a crosslinking agent capable of reacting with a hydroxyl group.

By using a polyester polyol or polyether polyol having an aromatic cyclic structure in the molecule as the polyester polyol or polyether polyol which is liquid at normal temperature, adhesion to a polyester film could be improved.

It has been found that the coating layer formed in the following stretching step is excellent in conformability to film deformation even when the coating agent is applied during the film stretching step, which is usually performed, in the in-line coating method by means of such a method, and thus good coating layer is obtained without causing cracking.

It is considered that such an effect of improving film forming properties at low temperature contributes to the fact that the water-dispersible polyurethane resin having an aromatic cyclic structure is plasticized by the polyester polyol or polyether polyol having an aromatic cyclic structure, which is liquid at normal temperature. However, the present inventors have confronted such a problem that, when a polyester polyol having an aromatic cyclic structure, which is liquid at normal temperature, is added in the water dispersion in the amount enough to exert the effect of improving film forming properties at low temperature, heat resistance deteriorates, resulting in poor blocking resistance.

The present inventors have further studied so as to solve the problem and found that good film forming properties and heat resistance do not deteriorate by the use of a polyester polyol, which itself has not water dispersibility but has hydrophobicity, as the polyester polyol having an aromatic cyclic structure, which is liquid at normal temperature and is to be added in a water dispersion, even when the amount to be added in the water dispersion is small.

It is considered that, when using a polyester polyol having hydrophobicity as the polyester polyol having an aromatic cyclic structure, the polyester polyol having an aromatic cyclic structure is incorporated into dispersed particles formed from the water-dispersible polyurethane resin, which stably exists in water, and exists in the form of being covered with the layer of the water-dispersible polyurethane resin. It is estimated that this exerts an influence on the fact that the effect of improving film forming properties at low temperature can be obtained even when the amount of the polyester polyol having an aromatic cyclic structure decreases.

At the beginning, we considered that film forming properties at low temperature can be improved more effectively by bonding both of water-dispersible polyurethane resin and the polyester polyol having an aromatic cyclic structure by means of a chemical bond in case of forming dispersed particles containing both of them, and studied. However, film forming properties at lower temperature could be improved when no chemical bond is formed between them.

The present inventors have found that adhesion to the base material such as polyester film is also improved by such a method and the coating layer thus formed is noticeably excellent in conformability to film deformation and is also excellent in heat resistance, water resistance, solvent resistance and transparency even when applied to the in-line coating method, and thus the present invention has been completed.

The present invention provides an aqueous coating agent comprising a water dispersion (C) prepared by dispersing resin particles containing a water-dispersible polyurethane resin (A) and at least one compound selected from a hydrophobic polyester polyol (B-1) and a hydrophobic polyether polyol (B-2) in water, and a crosslinking agent (D) capable of reacting with a hydroxyl group, wherein the water-dispersible polyurethane resin (A) is obtained by reacting a polyester polyol (a-1), which is obtained by condensing a dicarboxylic acid containing an aromatic dicarboxylic acid as a main component with a polyol, with a polyisocyanate, and also contains 15 to 35% by weight of an aromatic cyclic structural unit based on the weight of the water-dispersible polyurethane resin (A), and wherein the hydrophobic polyester polyol (B-1) and/or the hydrophobic polyether polyol (B-2) are liquid at normal temperature and contain 20 to 50% by weight of an aromatic cyclic structural unit based on the weight of the hydrophobic polyester polyol (B-1) and/or the hydrophobic polyether polyol (B-2).

The term "hydrophobic" is generally understood that a certain substance has such a property as weak interaction with water and weak affinity with water. However, the term "hydrophobic" as used herein means that a certain substance itself has a property which is not dispersible or soluble in water.

The term "liquid at normal temperature" as used herein means that it is liquid at 25° C.

BEST MODE FOR CARRYING OUT THE INVENTION

The best mode for carrying out the invention will be described in detail.

The aqueous coating agent of the present invention comprises a water dispersion (C) prepared by dispersing resin particles containing a water-dispersible polyurethane resin (A) and a hydrophobic polyester polyol (B-1) and/or a hydrophobic polyether polyol (B-2) in water, and a crosslinking agent (D) capable of reacting with a hydroxyl group.

It is preferable to substantially form no chemical bond between the water-dispersible polyurethane resin (A) and the hydrophobic polyester polyol (B-1) or the hydrophobic polyether polyol (B-2) contained in the resin particles because the water-dispersible polyurethane resin (A) can be effectively plasticized and the effect of improving film forming properties at low temperature exerted by the present invention can be further enhanced.

The water-dispersible polyurethane resin (A) having an aromatic cyclic structure used in the present invention will now be described.

The water-dispersible polyurethane resin (A) used in the present invention preferably has an aromatic cyclic structure and preferably has, as a hydrophilic group for imparting water dispersibility, an anionic group such as carboxyl group or sulfonic acid group or a salt thereof in the molecule.

The water-dispersible polyurethane resin (A) can be obtained by using a polyester polyol (a-1), which is obtained by condensing a dicarboxylic acid containing an aromatic dicarboxylic acid as a main component with a polyol, and a polyisocyanate as an essential component, optionally using the other polyol and polyamine as a chain extender, and reacting them according to a conventionally known method. As described in detail hereinafter, an anionic group can be introduced into the resulting water-dispersible polyurethane resin (A) by using at least one kind having an anionic group among the polyester polyol (a-1) and the other polyol and polyamine.

The content of the anionic group in the water-dispersible polyurethane resin (A) has a strong correlation with the particle size after the water-dispersible polyurethane resin (A) was formed into a water dispersion. In order to adjust the particle size within a proper range, the content of the anionic group is preferably adjusted within a range from 50 to 1000 mmol/kg based on the water-dispersible polyurethane resin (A). When the content is within the above range, it is made possible to obtain good dispersion stability of resin particles without deteriorating water resistance because the dispersed resin particles cause neither cohesion nor deposition after storage for a long period and are stable.

A conventionally known method can be employed as the method of introducing the anionic group into the water-dispersible polyurethane resin (A).

For example, there can be employed:

(i) a method of reacting a polyol containing a polyol having an anionic group such as carboxyl group or sulfonic acid group or a salt thereof as an essential component (the polyol having an anionic group may be either a polyester polyol (a-1) or the other polyol which is optionally used) with a polyisocyanate to produce a water-dispersible polyurethane resin (A), (ii) a method of reacting the polyol with the polyisocyanate under the conditions so that an isocyanate group of the polyisocyanate is present in excess to a hydroxyl group of the polyol in (i) to produce a prepolymer having an isocyanate group, and reacting the prepolymer with a low-molecular weight polyol and polyamine, thereby to perform chain extension (increase in molecular weight) to produce a water-dispersible polyurethane resin (A) having an anionic group, and (iii) a method of using a polyol (polyester polyol (a-1) having no anionic group, optionally the other polyol), reacting the polyol with the polyisocyanate under the conditions so that an isocyanate group of the polyisocyanate is present in excess to a hydroxyl group of the polyol to produce a prepolymer, and reacting the prepolymer with a low-molecular weight polyol and polyamine having an anionic group, thereby to perform chain extension (increase in molecular weight) to produce a water-dispersible polyurethane resin (A) having an anionic group.

In case the water-dispersible polyurethane resin (A) has a carboxyl group and/or a sulfonic acid group as the anionic group, good water dispersibility can be imparted by neutralizing a portion or all of them. In that case, there can also be used at least one neutralizer selected from the group consisting of organic amines such as ammonia, triethylamine, pyridine, and morpholine; alkanolamines such as monoethanolamine, and metal base compounds containing Na, K, Li, and Ca. The neutralization rate is preferably within a range from 0.5 to 3.0 (molar ratio), and more preferably from 0.9 to 2.0 (molar ratio), in terms of a ratio of a neutralizer to an anionic group. When the neutralization rate is within the above range, table water dispersibility can be imparted without deteriorating water resistance.

Typical examples of the polyol having a carboxyl group, which can be used as the polyol having an anionic group in the method (i) or (ii), include 2,2'-dimethylolpropionic acid, 2,2'-dimethylolbutanoic acid, 2,2'-dimethylolbutyric acid, and 2,2'-dimethylolvaleric acid. Carboxyl group-containing polyester polyols, which can be obtained by reacting these polyols having a carboxyl group with various polycarboxylic acids, can also be used.

Typical examples of the polyol having a sulfonic acid group, which can be used as the polyol having an anionic group in the method (i) or (ii), include polyester polyols having an aromatic sulfonic acid group or a salt thereof obtained by reacting a dicarboxylic acid such as 5-sulfoisophthalic acid, sulfoterephthalic acid, 4-sulfophthalic acid, or 5[4-sulfophenoxy]isophthalic acid, or a sulfonate of the dicarboxylic acid and at least one kind selected from the group consisting of metal ions such as Na, K, Li and Ca ions, ammonia, diethylamine, and triethylamine, with various polyols.

In addition to the polyol having an anionic group, there can also be used a nonion group-containing polyol such as polyalkylene glycol having a number-average molecular weight of 300 to 10,000, which contains at least 30% by weight of a repeating unit of ethylene oxide and also has at least one active hydrogen atom-containing group. The content of the nonionic group is preferably adjusted to 10% by weight or less based on the entire water-dispersible polyurethane resin (A). When the content is within the above range, good water dispersion stability can be obtained without deteriorating water resistance.

The polyester polyol (a-1) obtained by condensing the dicarboxylic acid containing an aromatic dicarboxylic acid as a main component with the polyol, which is used in the production of the water-dispersible polyurethane resin (A), will now be described. Such a polyester polyol (a-1) can be produced by a conventionally known method using conventionally known various dicarboxylic acids and polyols.

Examples of the aromatic dicarboxylic acid, which can be used in the production of the polyester polyol (a-1), include aromatic dicarboxylic acids such as terephthalic acid, isophthalic acid, orthophthalic acid, 1,4-naphthalenedicarboxylic acid, 2,5-naphthalenedicarboxylic acid, 2,6-naphthalenedicarboxylic acid, naphthalic acid, biphenyldicarboxylic acid, and 1,2-bis(phenoxy)ethane-P,P'-dicarboxylic acid, and acid anhydride or ester forming derivatives thereof; aromatic hydroxycarboxylic acids such as p-hydroxybenzoic acid, and ester forming derivatives thereof; and sulfonic acid group-containing aromatic dicarboxylic acids such as 5-sulfoisophthalic acid, and ester forming derivatives thereof.

In addition to these aromatic dicarboxylic acids, aliphatic carboxylic acids and alicyclic carboxylic acids can also be used. Examples thereof include aliphatic dicarboxylic acids such as succinic acid, succinic anhydride, adipic acid, suberic acid, azelaic acid, sebacic acid, dimer acid, maleic anhydride, and fumaric acid; alicyclic dicarboxylic acids such as 1,4-cyclohexanedicarboxylic acid; and anhydrides or ester forming derivatives thereof. These compounds may be used in combination.

Examples of the polyol, which can be used in the production of the polyester polyol (a-1), include polyols having an aromatic cyclic structure, such as bisphenol A, bisphenol S, hydroquinone, bishydroxyethoxybenzene, or alkylene oxide adducts thereof; aliphatic diols such as ethylene glycol, propylene glycol, 1,3-propanediol, 1,3-butanediol, 1,4-butanediol, 1,5-pentanediol, 1,6-hexanediol, neopentyl glycol, diethylene glycol, triethylene glycol, tetraethylene glycol, dipropylene glycol, tripropylene glycol, polyethylene glycol, 3-methyl-1,5-pentanediol, and 2-butyl-2-ethyl-1,3-propanediol; alicyclic diols such as 1,4-cyclohexanediol, 1,4-cyclohexanedimethanol, and hydrogenated bisphenol A; and polyols as a polyfunctional component, such as glycerin, trimethylolpropane, and pentaerythritol.

There can also be used aliphatic polyols obtained by ring-opening polymerization of a cyclic ester such as ε-caprolactone or γ-valerolactone in the presence of the above polyol and catalyst.

These aliphatic polyols may be used alone or in combination.

The polyester polyol (a-1) preferably has a hydroxyl value within a range from 10 to 350, and the hydroxyl value is particularly preferably within a range from 20 to 300. When the hydroxyl value is within the above range, the resulting polyurethane resin has a high cohesion energy and also the aqueous coating agent obtained by using the polyester polyol is excellent in solvent resistance, water resistance and blocking resistance.

In the production of the water-dispersible polyurethane resin (A) used in the present invention, it is preferable to use a polyester polyol obtained by condensing a dicarboxylic acid containing an aromatic dicarboxylic acid as a main component with a polyol, terephthalic acid and/or isophthalic acid accounting for 70 to 100 mol % of the total amount of the dicarboxylic acid, among the polyester polyol (a-1). By using such a polyester polyol, it is made possible to provide an aqueous coating agent capable of forming a coating layer which is excellent in adhesion to a base material, especially a polyester film, and is also excellent in heat resistance such as blocking resistance, water resistance, solvent resistance, and transparency.

In the production of the water-dispersible polyurethane resin (A) used in the present invention, polyols other than the above-described polyester polyol (a-1) can be used as long as adhesion to base material and blocking resistance are not adversely affected.

Examples of the polyol include polyester polyol, polyether polyol, and polycarbonate polyol. These polyols may be used alone or in combination. It is particularly preferable to mainly use a polyester polyol in view of excellent adhesion to various base materials and cost.

The polyester polyol can be produced by reacting the aliphatic carboxylic acid or alicyclic carboxylic acid, which was described as those used in the production of the polyester polyol (a-1), with various polyols according to a conventionally known method.

In this case, monoalcohols such as methanol, ethanol, n-butanol, isopropanol, and n-hexanol may be used in combination as long as an increase in molecular weight of the water-dispersible polyurethane resin (A) is not adversely affected.

As described above, there can be employed a method of previously reacting the polyester polyol (a-1) and, optionally, the other polyol with various polyisocyanates under the conditions so that an isocyanate group of the polyisocyanate is present in excess to a hydroxyl group of the entire polyol, in the production of the water-dispersible polyurethane resin (A), to produce a prepolymer having an isocyanate group, and reacting the prepolymer with a low-molecular weight polyol and polyamine, thereby to perform chain extension to increase the molecular weight.

In this case, as the low-molecular weight polyol, there can be used polyols having a carboxyl group, such as 2,2'-dimethylolpropionic acid, 2,2'-dimethylolbutanoic acid, 2,2'-dimethylolbutyric acid, and 2,2'-dimethylolvaleric acid; aliphatic diols such as ethylene glycol, propylene glycol, 1,3-propanediol, 1,3-butanediol, 1,4-butanediol, 1,5-pentanediol, 1,6-hexanediol, neopentyl glycol, diethylene glycol, triethylene glycol, tetraethylene glycol, dipropylene glycol, tripropylene glycol, polyethylene glycol, 3-methyl-1,5-pentanediol, and 2-butyl-2-ethyl-1,3-propanediol; and alicyclic diols such as 1,4-cyclohexanediol, 1,4-cyclohexanedimethanol, and hydrogenated bisphenol A. Furthermore, polyols such as glycerin, trimethylolpropane, and pentaerythritol can also be used as the polyfunctional component.

As the polyamine, there can be used polyamines having an anionic group, for example, diaminosulfonate such as metal salt of N-(2-sulfoethyl)ethylenediamine or 2-(β-aminoalkylaminopropionamide)-alkane sulfonate, and an adduct of an aliphatic primary diamine such as ethylenediamine and α-an olefin carboxylic acid such as (meth)acrylic acid; and polyamines having no anionic group, for example, diamines such as 1,2-diaminoethane, 1,2-or 1,3-diaminopropane, 1,2- or 1,3- or 1,4-diaminobutane, 1,5-diaminopentane, 1,6-diaminohexane, piperazine, N,N'-bis-(2-aminoethyl)piperazine, 1-amino-3-aminomethyl-3,5,5-trimethyl-cyclohexane (isophoronediamine), bis-(4-aminocyclohexyl)methane, bis-(4-amino-3-butylcyclohexyl)methane, and 1,2-, 1,3- or 1,4-diaminocyclohexane or 1,3-diaminopropane, polyamine such as diethylenetriamine or triethylenetetramine, and hydrazine or hydrazine derivatives such as dihydrazide adipate.

Furthermore, amino alcohols having both an amino group and an alcoholic hydroxyl group in the molecule can also be used and examples thereof include ethanolamine, N-methyldiethanolamine, propanolamine, N-methyldiisopropanolamine, N-ethyldiethyleneamine, N-ethyldiisopropanolamine, aminoethylethanolamine, and diethanolamine.

As the polyamine, a polyamine having the number of functional groups of 2 or more is preferably used so as not to adversely affect durability. In this case, a polyamine having the number of functional groups of 2 or more may be used alone, or two or more kinds of polyamines may be used to adjust the number of functional groups to 2 or more.

In case the molecular weight is increased by chain extension of the prepolymer having an isocyanate group, the amount of the polyamine is preferably 1.9 equivalents or less, and more preferably from 0.6 to 1.0 equivalents, per equivalent of the isocyanate group. When chain extension is performed by using the polyamine in the amount within the above range, the resulting aqueous coating agent is excellent in durability and light fastness.

The polyisocyanate, which is used in the production of the water-dispersible polyurethane resin (A) used in the present invention, may be a conventionally known polyisocyanate.

For example, there can be used 1,4-tetramethylene diisocyanate, 1,6-hexamethylene diisocyanate, 1,12-dodecamethylene diisocyanate, cyclohexane-1,3- or 1,4-diisocyanate, 1-isocyanato-3-isocyanatomethyl-3,5,5-trimethylcyclohexane (another name: isophorone diisocyanate, IPDI), dicyclohexylmethane-4,4'-diisocyanate (another name: hydrogenated MDI), 2- or 4-isocyanatocyclohexyl-2'-isocyanatocyclohexylmethane, 1,3- or 1,4-bis-(isocyanatomethyl)-cyclohexane, bis-(4-isocyanato-3-methylcyclohexyl)methane, 1,3- or 1,4-α,α,α',α'-tetramethylxylylene diisocyanate, 2,4- or 2,6-diisocyanatotoluene, 2,2'-, 2,4'- or 4,4'-diisocyanatodiphenylmethane (MDI), 1,5-naphthalene diisocyanate, p- or m-phenylene diisocyanate, xylylene diisocyanate, and diphenyl-4,4'-diisocyanate.

Among these polyisocyanates, an aromatic diisocyanate is preferably used in view of mechanical strength, and an aliphatic or alicyclic diisocyanate compound is preferably used in view of durability and light fastness.

As the organic solvent used in the production of the water-dispersible polyurethane resin (A), an organic solvent having a boiling point of 150° C. or lower is preferably used in view of formation of fine particles upon water dispersion, and removal of the residual solvent contained in the water dispersion (C) after distillation.

Examples of the organic solvent having a boiling point of 150° C. or lower include benzene, toluene, ethyl acetate, acetone, methyl ethyl ketone, diethyl ether, tetrahydrofuran, methyl acetate, acetonitrile, chloroform, and methylene chloride. These organic solvents can be used alone or in combination. Among these organic solvents, acetone, methyl ethyl ketone and ethyl acetate are preferably used as the solvent having high solubility to the water-dispersible polyurethane resin (A). For the purpose of further enhancing water dispersibility, an alcohol solvent such as methanol, ethanol or isopropyl alcohol may be used upon water dispersion as long as an increase in molecular weight of the polyurethane resin is not adversely affected.

The content of the urethane-bond unit (—NH—COO—) per 1000 g of the water-dispersible polyurethane resin (A) is preferably within a range from 1.0 to 4.0 mols.

As described above, a urea bond is formed when chain extension is performed by reacting the prepolymer with the polyamine. In this case, the total of the content of the urethane-bond unit (—NH—COO—) and the urea bond unit (—NH—CO—NH—) per 1000 g of the water-dispersible polyurethane resin (A) is preferably within a range from 1.0 to 4.0 mols.

When the total of the content is within the above range, a cohesion energy of the polyurethane molecule increases and therefore the resulting coating layer has suitable hardness, and thus making possible to improve solvent resistance, and heat resistance such as blocking resistance.

The content of the aromatic cyclic structural unit in the water-dispersible polyurethane resin (A) is preferably within a range from 15 to 35% by weight, and more preferably from 20 to 30% by weight. When the content is within the above range, the resulting aqueous coating agent is particularly excellent in adhesion to polyester base material, solvent resistance, water resistance, and heat resistance such as blocking resistance.

The number-average molecular weight of the water-dispersible polyurethane resin (A) is preferably within a range from 5000 to 50000, and more preferably from 6000 to 30000. When the number-average molecular weight is within the above range, the resulting aqueous coating agent is excellent in solvent resistance, water resistance, and heat resistance such as blocking resistance.

The hydrophobic polyester polyol (B-1) and hydrophobic polyether polyol (B-2), which are liquid at normal temperature and also contain 20 to 50% by weight of an aromatic cyclic structural unit, used in the present invention will now be described.

The term "hydrophobic polyol (B)" as used herein means both a hydrophobic polyester polyol (B-1) and a hydrophobic polyether polyol (B-2).

Since the hydrophobic polyol (B) is liquid at normal temperature, it serves as a film forming agent and accelerates plasticization of the water-dispersible polyurethane resin (A), thus making it possible to improve film forming properties. To further enhance such an effect, it is preferable that the hydrophobic polyol (B) and the water-dispersible polyurethane resin (A) are not substantially chemically-bonded.

Although the hydrophobic polyol (B) itself has no water dispersibility, it is incorporated into dispersed particles formed from the water-dispersible polyurethane resin (A), which stably exists in water, and exists in the form of being covered with the layer of the water-dispersible polyurethane resin. It is estimated that this form makes it possible to exert a preferable effect of improving film forming properties at low temperature even when the amount of the hydrophobic polyol (B) decreases.

The content of the hydrophilic group enough to make the hydrophobic polyol (B) to be hydrophobic preferably satisfies the following both of conditions: (1) 50 mmol/kg or less in case of an ionic group, and (2) 5% by weight or less in case of an ethylene oxide [$(CH_2CH_2O)n$: $n \geqq 5$] constituent unit having 5 or more repeating units. By using such a hydrophobic polyol (B), the resulting coating layer is excellent in water resistance.

The hydrophobic polyester polyol (B-1) used in the present invention can be produced by a conventionally known method using conventionally known various dicarboxylic acids and polyols. However, any of the above dicarboxylic acids and polyols must have an aromatic cyclic structure.

As the aromatic dicarboxylic acid which can be used in the production of the hydrophobic polyester polyol (B-1), the aliphatic carboxylic acid, the alicyclic carboxylic acid and the polyol having an aromatic cyclic structure which can be used in combination with the aromatic dicarboxylic acid, and the aliphatic polyol and the alicyclic polyol which can be used in combination with the aromatic dicarboxylic acid, for example, there can be used those described in the production of the polyester polyol (a-1), which is a raw material of the water-dispersible polyurethane resin (A), respectively.

In case of the hydrophobic polyester polyol (B-1), it is preferable that at least one polycarboxylic acid selected from isophthalic acid and orthophthalic acid accounts for 60 mol % or more of the entire dicarboxylic acid to be used, while the polyol to be used is an aliphatic polyol having 2 to 8 carbon atoms.

It is more preferable that orthophthalic acid accounts for at least 60 mol % of the total amount of the dicarboxylic acid. By using such a dicarboxylic acid, the resulting hydrophobic polyester polyol (B-1) has low crystallinity and is liquid which is suited for use in the present invention.

It is more preferable that at least one polyol selected from the group consisting of ethylene glycol, diethylene glycol and triethylene glycol accounts for 50 mol % or more of the entire polyol.

Consequently, the resulting hydrophobic polyester polyol (B-1) has low crystal orientation and is liquid at normal temperature, and also can plasticize the water-dispersible polyurethane resin (A) more effectively. Therefore, film forming properties at low temperature are improved, and thus making it possible to form a markedly uniform coating layer when applied to the off-line coating method where drying is performed at comparatively low temperature of 100° C. or lower, or drying is performed at normal temperature.

The hydrophobic polyether polyol (B-2) can be produced by adding a cyclic ether compound or cyclic carbonate compound such as alkylene oxide to a polyol having various aromatic cyclic structures by means of the ring-opening polymerization reaction in the presence of a catalyst. A cyclic compound adduct of a polynuclear phenol compound, which is obtained by reacting a polynuclear phenol compound with a cyclic compound such as alkylene oxide described hereinafter in the presence of a catalyst, is more preferable and a propylene oxide adduct of a polynuclear phenol compound is particularly preferable.

Examples of the polynuclear phenol compound include bisphenol compounds such as bisphenol A, bisphenol S, bisphenol F, bisphenol E, bisphenol Z, tetramethylbisphenol A, diallylbisphenol A, 4-4'-oxybisphenol, biphenol, tetramethylbiphenol, bisphenol fluorene, biscresol fluorene, and terpene diphenol; and novolaks such as phenol novolak, cresol novolak, xylylene novolak, bisphenol A novolak, triphenylmethane novolak, biphenyl novolak, dicyclopentadienephenol novolak, and terpenephenol novolak, and these polynuclear phenol compounds can be used alone or in combination.

Examples of the cyclic compound include cyclic ether compounds such as ethylene oxide, propylene oxide, butylene oxide, oxetane, and tetrahydrofuran; and cyclic carbonate compounds such as ethylene carbonate and propylene carbonate. These cyclic compounds can be used alone or in combination.

As the hydrophobic polyether polyol (B-2), a propylene oxide adduct of a bisphenol compound containing a constituent unit originating from propylene oxide and a propylene oxide adduct of a phenol novolak compound are preferable because they are liquid at normal temperature. In case of the hydrophobic polyether polyol, film forming properties at low temperature are improved by enhancing the plasticization effect to the water-dispersible polyurethane resin (A), and thus making it possible to form a markedly uniform coating layer even when coating and drying are performed at comparatively low temperature.

In this case, in view of compatibility with the water-dispersible polyurethane resin (A), those obtained by adding 2 to 60 mols of propylene oxide to 1 mol of the polyol having an aromatic cyclic structure are preferable, and those obtained by adding 2.5 to 30 mols of propylene oxide to 1 mol of the polyol having an aromatic cyclic structure are more preferable.

The number-average molecular weight of the hydrophobic polyol (B) is preferably within a range from 200 to 4000, and more preferably from 250 to 2000. When the number-average molecular weight is within the above range, the hydrophobic polyol (B) has low viscosity at normal temperature and film forming properties at low temperature can be improved by enhancing the plasticization effect to the water-dispersible polyurethane resin (A).

The hydroxyl value of the hydrophobic polyol (B) is preferably within a range from 20 to 500, and more preferably form 50 to 400. When the hydroxyl value and the number-average molecular weight of the hydrophobic polyol (B) are within the above range, reactivity with the crosslinking agent (D) capable of reacting with a hydroxyl group is improved and the crosslinking reaction proceeds without adversely affecting film forming properties at low temperature. Therefore, even when applied during the film stretching step in the in-line coating method where processing is performed at high temperature, it is made possible to form a tough coating layer having excellent conformability to film deformation without causing cracking after the completion of the crosslinking reaction, during the following stretching step, and thus making it possible to improve solvent resistance, water resistance, and heat resistance such as blocking resistance.

The hydrophobic polyester polyol (B-1) and the hydrophobic polyether polyol (B-2) may be used alone or in combination, respectively. Among these polyols, a hydrophobic polyester polyol (B-1) is preferable in view of adhesion to polyester base material and blocking resistance.

The content of the aromatic cyclic structural unit in the hydrophobic polyol (B) is preferably within a range from 20 to 50% by weight, and more preferably from 25 to 40% by weight.

When the content is within the above range, the coating film obtained after crosslinking is particularly excellent in adhesion to polyester base material, solvent resistance, water resistance, and heat resistance such as blocking resistance.

The method of producing the water dispersion (C), which is prepared by dispersing resin particles containing the water-dispersible polyurethane resin (A) and the hydrophobic polyol (B) in water, used in the present invention will now be described.

Such a water dispersion (C) can be produced by using various conventionally known methods, for example, the following methods (i) and (ii) in combination. (i) A water dispersion (C) can be obtained by uniformly mixing a water-dispersible polyurethane resin (A) with a hydrophobic polyol (B), neutralizing the mixture, adding water to the mixture, thereby to emulsify and disperse the mixture, and optionally performing distillation. (ii) A prepolymer having a residual isocyanate group is produced by reacting a polyester polyol (a-1) and, optionally, the other polyol with a polyisocyanate in an equivalent ratio of an isocyanate group to a hydroxyl group within a range from (1 to 3) to 1, and preferably from (1 to 2) to 1 in an organic aprotic solvent under the conditions of a temperature within a range from 30 to 150° C., and preferably from 50 to 120° C., using a one-shot method or a multistage method.

In this case, a prepolymer having an anionic group can be obtained by using a polyol having a carboxyl group or a sulfonic acid group as the polyol. In this case, the polyol having a carboxyl group or a sulfonic acid group may be either a polyester polyol (a-1), or the other polyol which is optionally used.

The resulting prepolymer is mixed with the hydrophobic polyol (B) and then the mixture is uniformly melted. In this case, it is important to maintain at 60° C. or lower so that the isocyanate group of the prepolymer does not react with the hydroxyl group of the hydrophobic polyol (B).

After neutralizing the mixture, the mixture is emulsified and dispersed by adding water dropwise or introducing water by several portions. In this case, it is important to emulsify at 60° C. or lower so as to avoid the side reaction with water.

Then, an aqueous solution containing a low-molecular weight polyol or polyamine is added in the water dispersion in which the isocyanate group is remained, thereby to perform chain extension (increase in molecular weight), and thus the objective water dispersion (C) is obtained. An aqueous dispersion (C) with less harmfulness can be obtained by optionally performing desolvation of the resulting water dispersion.

The mixing ratio of the water-dispersible polyurethane resin (A) to the hydrophobic polyol (B) used in the present invention, (A)/(B), is preferably within a range from 95/5 to 50/50, and particularly preferably from 90/10 to 70/30 in terms of a weight ratio. When the mixing ratio is within the above range, it is made possible to stably form particles without deteriorating water dispersibility. Since the water-dispersible polyurethane resin (A) is appropriately plasticized by the hydrophobic polyol (B) and the resulting aqueous coating agent is excellent in film forming properties at low temperature and conformability to base material, it is made possible to form a good coating layer without causing coating film defects even when applied to either the in-line coating method or the off-line coating method.

The crosslinking agent (D) capable of reacting with a hydroxyl group used in the present invention will now be described.

The crosslinking agent (D) is used to improve heat resistance such as blocking resistance, wet heat resistance and solvent resistance of the coating layer formed by using the aqueous coating agent of the present invention. As the crosslinking agent (D), for example, amino resin and polyisocyanate can be used. The polyisocyanate is preferably a polyisocyanate which contains polyoxyethylene and a hydrophilic group, and also has water solubility or water dispersibility.

When the crosslinking agent (D) is mixed with the water dispersion (C) used in the present invention, it reacts with the hydrophobic polyester polyol (B-1) or the water-dispersible polyurethane resin (A) at normal temperature with a lapse of time, and also the crosslinking agent (D) itself causes self-condensation. Therefore, it is not preferable that the crosslinking agent is stored for a long time after mixing with the water dispersion (C). Although the pot life varies depending on the kind of the crosslinking agent (D), the aqueous coating agent of the present invention is preferably prepared by mixing the crosslinking agent (D) with the water dispersion (C) according to a conventionally known method immediately before applying to the base material. When using a polyisocyanate as the crosslinking agent (D), the polyisocyanate is preferably used as soon as possible after mixing with the water dispersion (C).

The amount of the crosslinking agent (D) is preferably within a range from 1 to 20% by weight, and more preferably form 3 to 10% by weight, based on the water-dispersible polyurethane resin (A) and the hydrophobic polyol (B) of the present invention. When the amount is within the above range, it is made possible to improve heat resistance such as blocking resistance, wet heat resistance and solvent resistance of the resulting coating layer without adversely affecting adhesion to base material and conformability.

These crosslinking agents (D) can be used in combination and also curing accelerators can be used. Crosslinking agents such as epoxy compound, carbodiimide, aziridine compound and oxazoline compound can also be used.

The aqueous coating agent of the present invention can contain aqueous acrylic resins, aqueous polyester resins and SBR latex resin (styrene-butadiene rubbers) as long as adhesion to base material and film forming properties at low temperature are not adversely affected. The coating agent preferably contains these resins in the amount of 30% by weight or less, and more preferably 10% by weight or less in terms of the solid content.

If necessary, the aqueous coating agent of the present invention can further contain inorganic fine particles (colloidal silica) for improving blocking resistance or slip resistance; alcohols (ethanol and isopropyl alcohol) for improving wettability; anionic, nonionic hydrocarbon or fluorine surfactants; acetylene glycol leveling agents "SURFYNOL" (manufactured by Air Products Co.); and polyalkylene glycol-modified polysiloxanes such as BYK-348, 346, 345 and 341 (manufactured by BYK-Chemie GmbH). Among these additives, acetylene glycol leveling agents are preferably used to improve wettability. Auxiliaries such as antistatic agents can also be blended.

After adjusting to any resin concentration, the aqueous coating agent of the present invention can be applied on a base material by conventionally known coating methods such as gravure coating method, rod coating method, spray coating method, air knife coating method, and roll coating method.

In this case, the concentration of the resin in the aqueous coating agent is preferably adjusted within a range from 0.1 to 40% by weight.

In this case, the thickness of the coating layer is preferably within a range from 0.01 to 100 μm, and more preferably from 0.05 to 50 μm. When the thickness is within the above range., the surface of the base material can be modified without adversely affecting characteristics of the base material.

The aqueous coating agent of the present invention is excellent in adhesion to textiles, synthetic leathers, artificial leathers, natural leathers, metals (aluminum, iron, copper), rubbers, glasses, papers, and lumbers, and its dry film is excellent in water resistance and blocking resistance. Therefore, the aqueous coating agent of the present invention is can be used in the fields of treating agents for fibers and leather base materials, and aqueous coating agents and is therefore extremely useful.

Furthermore, the aqueous coating agent of the present invention can exert various performances described above even when applied to plastics. As the plastic, a biaxially stretched plastic film can be used. To further enhance the effect of the present invention, the aqueous coating agent is preferably applied during the biaxial stretching step of the plastic film, i.e. before the completion of the biaxial stretching treatment.

Preferable examples of the film made of plastics, on which the aqueous coating agent of the present invention is applied, include vinyl chloride resin, vinylidene chloride resin, polyamide resin (nylon), polyolefin resin (polyethylene resin, polypropylene resin), polyester resin, unsaturated polyester resin, polyurethane resin, polystyrene resin, acrylic resin, ethylene-vinyl acetate copolymer, polyvinyl-alcohol polymer, and ethylene-vinyl alcohol copolymer. Among these plastics, a polyester resin and a polyamide resin are particularly preferable.

Examples of the polyester resin include polyalkylene terephthalate as a main component, such as polyethylene terephthalate, polybutylene terephthalate or polyethylene naphthalate, and the polyester resin may be in the form of a film, a sheet, and a molded article. It further includes those obtained by copolymerization of other aromatic dicarboxylic acids such as isophthalic acid and 2,6-naphthalenedicarboxylic acid, or mixtures thereof, and these materials may be in the form of a film, a sheet, and a molded article.

Examples of the polyamide resin include nylon 6 (polycaproamide), nylon 66 (polyhexamethyleneadipamide), nylon 610 (polyhexamethylene sebacamide), nylon 11 (polyundecanamide), nylon 12 (polylauroamide), methaxylylenediamine nylon, copolymers, modified products and mixtures thereof, and these materials may be in the form of a film, a sheet, and a molded article.

The aqueous coating agent of the present invention can be preferably used as surface modifiers for plastic films, but is more preferably used as primer coating agents and anchor coating agents which are used for the purpose of improving adhesion of the surface of plastic films.

The aqueous coating agent of the present invention can also serve as effective aqueous primer coating agents and aqueous anchor coating agents to plastics which are not subjected to a surface treatment. To further enhance the effect, it is preferable to use plastics which are previously subjected to physical and chemical treatments, such as corona treatment and alkali treatment.

The aqueous coating agent of the present invention has processability in a wide temperature range and excellent adhesion to base material and is also excellent in blocking resistance, water resistance and solvent resistance, and is therefore applied to not only the in-line processing method, but also to the off-line processing method. Thus, the aqueous coating agent of the present invention can be widely used in the fields such as food packaging films, gas-barrier films and vaccum metalized films.

EXAMPLES

The present invention will be described in detail by the examples, but is not limited to the following examples. In the examples, parts and percentages are by weight unless otherwise specified. The procedures for evaluation of various properties are as follows. The present invention is not limited to the following respective examples and constituent features of these examples may be appropriately combined.

[Preparation of Aqueous Coating Agents A and B]

To an aqueous solution prepared by diluting 100 parts of each of water dispersions obtained in the Examples and Comparative Examples described hereinafter with 100 parts of water, 2 parts of AQANATE 100 (isocyanurate compound of hexamethylene diisocyanate having a polyethylene glycol side chain, manufactured by NIPPON POLYURETHANE INDUSTRY CO., LTD.) was added and the mixture was sufficiently stirred so as to uniformly disperse the isocyanurate compound to obtain an aqueous coating agent A.

To an aqueous solution prepared by diluting 100 parts of each of water dispersions obtained in the Examples and Comparative Examples described hereinafter with 100 parts of water, 5 parts of BECKAMINE APM (trimethylolmelamine resin, manufactured by DAINIPPON INK & CHEMICALS Co., Ltd.) was added and the mixture was sufficiently stirred so as to uniformly disperse the trimethylolmelamine resin to obtain an aqueous coating agent B.

[Procedure for Evaluation of Film Forming Properties]

1 g of the aqueous coating agent B prepared as described above was transferred onto a metal laboratory dish having a diameter of 65 mm and then uniformly diluted by adding 4 g of water to obtain a sample, which was dried under the conditions of a temperature of 5° C. or 20° C. and a relative humidity of 50% for 24 hours to form a film. The surface conditions of the resulting film were visually observed and then evaluated by the following three-rank rating system.

A: uniform film was formed
B: film was formed with cracking
C: formed into powder without forming film

[Production of Coating Film]

On a base film (PET: 12 μm, OPP (oriented polypropyrene): 15 μm), each aqueous coating agent prepared above was applied in a dry thickness of about 0.3 μm, and then heat-treated and cured under the following conditions to obtain a surface-treated film.

Aqueous coating agent A: It was heat-treated at 80° C. for 60 seconds and then cured at a temperature of 23° C. and a relative humidity of 65% for 2 days.

Aqueous coating agent B: It was heat-treated at 150° C. for 5 minutes and then cured at a temperature of 23° C. and a relative humidity of 65% for 2 days.

[Adhesion to Base Material <Cellophane Adhesive Tape Peeling Test>]

The surface-treated film (PET, OPP) obtained above was subjected to a peeling test using an adhesive tape having a width of 24 mm manufactured by NICHIBAN CO., LTD., and then the results were evaluated by the following five-rank rating system.

1: week adhesive force, completely peeled
2: 50% or more of sample was peeled
3: 10 to 50% of sample was peeled
4: considerably strong adhesive force, only less than 10% of sample was peeled
5 very adhesive force, not peeled

[Test of Conformability to Base Material]

After stretching the surface-treated OPP film obtained by using the aqueous coating agent B by hand, the surface conditions of the coating layer were observed and the results were evaluated by the following three-rank rating system.

A: cracking did not occur
B: cracking slightly occurred, no peeling of coating layer
C: cracking occurred, coating layer was completely peeled from film

[Blocking Resistance]

After laminating the treated surfaces of the surface-treated film obtained by using the aqueous coating agent B with each other, the film was allowed to stand under a load of 100 g/cm$^2$ in an atmosphere at a temperature of 40° C. and a relative humidity of 65% for 24 hours and the film was peeled. Adhesion was evaluated by the following three-rank rating system.

A: no adhesion, easily peelable
B: some adhesion, no change in coated surface
C: surface defects of some coated surface were caused by adhesion

[Solvent Resistance]

After rubbing the coating layer of the surface-treated PET film obtained by using the aqueous coating agent B using a cotton bar impregnated with ethyl acetate, the number of rubbings until the coating layer was removed and the base material layer appears was evaluated by the following five-rank rating system.

1: less than 10%
2: 10 to 20
3: 20 to 30
4: 30 to 40
5: 50 or more

[Water Resistance]

After dipping the surface-treated PET film obtained by using the aqueous coating agent B in warm water at 40° C. for 24 hours, a peeling test using a cellophane adhesive tape was performed.

[Adhesion to Ink]

On the surface-treated PET film obtained by using the aqueous coating agent B, a gravure ink was applied in a dry thickness of about 10 μm using a bar coater, dried at 80° C. and aged at 60° C. for one day. Then, a peeling test using a cellophane adhesive tape was performed. The results were evaluated by the following five-rank rating system.

1: very week adhesive force, completely peeled
2: 50% or more of sample was peeled
3: 10 to 50% of sample was peeled
4: considerably strong adhesive force, only less than 10% of sample was peeled
5: very adhesive force, not peeled Gravure ink used for evaluation
"CLS-709 White" (gravure ink for cellophane printing, manufactured by DAINIPPON INK & CHEMICALS Co., Ltd.): 50 parts
mixed solvent of toluene/ethyl acetate/methyl ethyl ketone=1/1/1 (weight ratio): 100 parts <Preparation of Polyester Polyol for Preparation of Water-Dispersible Polyurethane Resin (A)>

In a reaction vessel equipped with a thermometer, a nitrogen gas introducing tube and a stirrer, 830 parts of terephthalic acid, 830 parts of isophthalic acid, 374 parts of ethylene glycol, 598 parts of neopentyl glycol and 0.5 parts of dibutyltin oxide were charged while introducing a nitrogen gas and the polycondensation reaction was performed at 230° C. for 15 hours until the acid value became 1 or less at 180 to 230° C. to obtain a polyester polyol P-1 having a hydroxyl value of 74.5 and an acid value of 0.2.

According to the formulation shown in Table 1, a polyester polyol P-3 was obtained by the same procedure as described above.

In a reaction vessel equipped with a thermometer, a nitrogen gas introducing tube and a stirrer, 664 parts of terephthalic acid, 631 parts of isophthalic acid, 472 parts of 1,4-butanediol, 447 parts of neopentyl glycol and 0.5 parts of dibutyltin oxide were charged while introducing a nitrogen gas and, after esterifying at 180 to 230° C. for 5 hours, the polycondensation reaction was performed at 230° C. for 6 hours until the acid value became 1 or less. After cooling to 120° C., 321 parts of adipic acid and 268 parts of 2,2'-dimethylolpropionic acid were added and the mixture was heated to 170° C. again and then reacted at the same temperature for 20 hours to obtain a carboxyl group-containing polyester polyol P-2 having an acid value of 46.5 and a hydroxyl value of 59.8 (see Table 1).

TABLE 1

Formulation of raw materials of polyester polyol

|  | Polyester polyol P-1 Aromatic | Polyester polyol P-2 Aromatic (containing carboxyl group) | Polyester polyol P-3 Aliphatic |
|---|---|---|---|
| Terephthalic acid (Parts) | 830 | 664 |  |
| Isophthalic acid (Parts) | 830 | 631 |  |
| Adipic acid (Parts) |  | 321 | 1460 |
| Ethylene glycol (Parts) | 374 |  |  |

TABLE 1-continued

Formulation of raw materials of polyester polyol

|  | Polyester polyol P-1 Aromatic | Polyester polyol P-2 Aromatic (containing carboxyl group) | Polyester polyol P-3 Aliphatic |
|---|---|---|---|
| 1,4-butanediol (Parts) |  | 472 | 1024 |
| Neopentyl glycol (Parts) | 598 | 447 |  |
| 2,2'-dimethylolpropionic acid (Parts) |  | 268 |  |
| Molar ratio of dicarboxylic acid |  |  |  |
| Aromatic/Aliphatic | 10/0 | 8/2 | 0/10 |
| Content of aromatic cyclic structural unit of polyester polyol | 34.8% | 25.2% | 0.0% |
| Hydroxyl value (mgKOH/g) | 74.5 | 59.8 | 56.0 |
| Acid value (mgKOH/g) | 0.2 | 46.5 | 0.1 |
| Number-average molecular weight | 1500 | 1880 | 2000 |

<Preparation of Hydrophobic Polyester Polyol>

In a reaction vessel equipped with a thermometer, a nitrogen gas introducing tube and a stirrer, 1660 parts of orthophthalic acid, 1637 parts of diethylene glycol and 0.5 parts of dibutyltin oxide were charged while charging a nitrogen gas and the polycondensation reaction was performed at 230° C. for 15 hours until the acid value reaches 1 or less at 180 to 230° C. to obtain a polyester polyol Q-1 which has an aromatic cyclic structure and also has a hydroxyl value of 190 and an acid value of 0.3.

According to the formulation shown in Table 2, polyester polyols having an aromatic cyclic structure Q-3 and Q-4 and a polyester polyol Q-2 were obtained by the same procedure as described above.

<Preparation of Hydrophobic Polyether Polyol>

A liquid compound obtained by adding 2.8 mols of propylene oxide to 1 mol of bisphenol A was referred to as a polyether polyol R. The resulting polyether polyol R had a hydroxyl value of 282 and an aromatic cyclic structural unit content of 39.9%.

TABLE 2

Formulation of raw materials of polyester polyol

|  | Polyester polyol Q-1 Aromatic | Polyester polyol Q-2 Aliphatic | Polyester polyol Q-3 Aromatic | Polyester polyol Q-4 Aromatic |
|---|---|---|---|---|
| Orthophthalic acid (Parts) | 1660 |  | 1660 |  |
| Adipic acid (Parts) |  | 1460 |  | 1460 |
| Diethylene glycol (Parts) | 1637 | 1637 |  |  |
| Ethylene glycol (Parts) |  |  | 1277 |  |
| bisphenol A (Parts) |  |  |  | 3523 |
| Hydroxyl value (mgKOH/g) | 190.0 | 205.0 | 440.0 | 119.0 |
| Acid value (mgKOH/g) | 0.3 | 0.3 | 0.3 | 0.5 |
| Form of resin (25° C.) | Liquid | Solid | Liquid | Solid |
| Content of aromatic cyclic structural unit | 27.0% | 0.0% | 30.7% | 51.8% |

Example 1

1000 Parts of the polyester polyol P-1 was dehydrated at 100° C. under reduced pressure, cooled to 80° C. and then dissolved in 907 parts of methyl ethyl ketone while sufficiently stirring. After adding 80 parts of 2,2'-dimethylolpropionic acid and 281 parts of isophorone diisocyanate, the reaction was performed at 75° C. for 8 hours and the urethanization step was carried out.

After confirming that the isocyanate value became 0.1% or less and cooling to 50° C., 340 parts of the polyester polyol Q-1 was added to form a uniform solution. The solution was neutralized with 60 parts of triethylamine and then water-dispersed by adding 7000 parts of water.

After removing methyl ethyl ketone from the resulting transparent reaction product at 40 to 60° C. under reduced pressure, the concentration was adjusted by adding water to obtain a stable transparent colloidal water dispersion having a nonvolatile content of 20%.

Using the resulting water dispersion, aqueous coating agents A and B were prepared in the same manner as described above and various evaluations were performed. As a result, the resulting aqueous coating agents were excellent in all physical properties, for example, adhesion to base material, conformability to base material, blocking resistance, solvent resistance, water resistance and ink adhesion (see Table 3-1).

Example 2

The same operation as in Example 1 was performed, except that 340 parts of the polyether polyol H was used in place of the polyester polyol Q-1 of Example 1, as shown in Table 3-1, a stable transparent colloidal water dispersion having a nonvolatile content of 20% was obtained.

Using the resulting water dispersion, aqueous coating agents A and B were prepared in the same manner as described above and various evaluations were performed. As a result, the resulting aqueous coating agents were excellent in physical properties, as shown in Table 3-1.

Example 3

1000 Parts of the polyester polyol P-2 was dehydrated at 100° C. under reduced pressure, cooled to 80° C. and then dissolved in 812 parts of methyl ethyl ketone while sufficiently stirring. After adding 20 parts of 1,4-butanediol and 198 parts of dicyclohexylmethane-4,4'-diisocyanate (hydrogenated MDI), the reaction was performed at 75° C. for 8 hours.

After confirming that the isocyanate value became 0.1% or less and cooling to 50° C., 135 parts of the polyester polyol Q-1 was added and the solution was neutralized with 84 parts of triethylamine and then water-dispersed by adding 7000 parts of water.

After removing methyl ethyl ketone from the resulting transparent reaction product at 40 to 60° C. under reduced pressure, the concentration was adjusted by adding water to obtain a stable transparent colloidal water dispersion having a nonvolatile content of 20%.

Using the resulting water dispersion, aqueous coating agents A and B were prepared in the same manner as described above and various evaluations were performed. As a result, the resulting aqueous coating agents were excellent in physical properties, as shown in Table 3-1.

Example 4

The same operation as in Example 1 was performed, except that 151 parts of the polyether polyol Q-3 was used in place of the polyester polyol Q-1 of Example 1, as shown in Table 3-1, a stable transparent colloidal water dispersion having a nonvolatile content of 20% was obtained.

Using the resulting water dispersion, aqueous coating agents A and B were prepared in the same manner as described above and various evaluations were performed. As a result, the resulting aqueous coating agents were excellent in physical properties, as shown in Table 3-1.

Example 5

The same operation as in Example 1 was performed, except that 583 parts of the polyether polyol Q-3 was used in place of the polyester polyol Q-1 of Example 1, as shown in Table 3-1, a stable transparent colloidal water dispersion having a nonvolatile content of 20% was obtained.

Using the resulting water dispersion, aqueous coating agents A and B were prepared in the same manner as described above and various evaluations were performed. As a result, the resulting aqueous coating agents were excellent in physical properties, as shown in Table 3-1.

Comparative Example 1

1000 Parts of the polyester polyol P-3 was dehydrated at 100° C. under reduced pressure, cooled to 80° C. and then dissolved in 897 parts of methyl ethyl ketone while sufficiently stirring. After adding 80 parts of 2,2'-dimethylolpropionic acid and 244 parts of isophorone diisocyanate, the reaction was performed at 75° C. for 8 hours.

After confirming that the isocyanate value became 0.1% or less and cooling to 50° C., 70 parts of the polyester polyol Q-1 was added and the solution was neutralized with 53 parts of triethylamine and then water-dispersed by adding 7000 parts of water.

After removing methyl ethyl ketone from the resulting transparent reaction product at 40 to 60° C. under reduced pressure, the concentration was adjusted by adding water to obtain a stable transparent colloidal water dispersion having a nonvolatile content of 20%.

Using the resulting water dispersion, aqueous coating agents A and B were prepared in the same manner as described above and various evaluations were performed. As a result, the resulting aqueous coating agents were insufficient in adhesion to base material, blocking resistance and solvent resistance, as shown in Table 3-2.

Comparative Example 2

The same operation as in Example 1 was performed, except that the polyester polyol Q-1 of Example 1 was not used, as shown in Table 3-2, a stable transparent colloidal water dispersion having a nonvolatile content of 20% was obtained.

Using the resulting water dispersion, aqueous coating agents A and B were prepared in the same manner as described above and various evaluations were performed. As a result, the resulting aqueous coating agents were inferior in film forming properties and were insufficient in OPP adhesion and conformability to base material, as shown in Table 3-2.

Comparative Example 3

The same operation as in Example 1 was performed, except that the polyether polyol Q-2 was used in place of the polyester polyol Q-1 of Example 1, as shown in Table 3-2. As a result, a stable water dispersion could not be obtained because of poor compatibility between the polyurethane resin and the polyether polyol Q-2.

Comparative Example 4

The same operation as in Example 1 was performed, except that the polyether polyol Q-4 was used in place of the polyester polyol Q-1 of Example 1, as shown in Table 3-2, a stable transparent colloidal water dispersion having a nonvolatile content of 20% was obtained.

Using the resulting water dispersion, aqueous coating agents A and B were prepared in the same manner as described above and various evaluations were performed. As a result, the resulting aqueous coating agents were inferior in film forming properties and were insufficient in adhesion to OPP base material and conformability to base material, as shown in Table 3-2.

Comparative Example 5

800 Parts of the polyester polyol P-1 and 200 parts of the polyester polyol Q-1 were dehydrated at 100° C. under reduced pressure, cooled to 80° C. and then dissolved in 977 parts of methyl ethyl ketone while sufficiently stirring. After adding 80 parts of 2,2'-dimethylolpropionic acid and 385 parts of dicyclohexylmethane-4,4'-diisocyanate (hydrogenated MDI), the reaction was performed at 75° C. for 8 hours.

After confirming that the isocyanate value became 0.1% or less and cooling to 50° C., the solution was neutralized with 60 parts of triethylamine and then water-dispersed by adding 7000 parts of water. After removing methyl ethyl ketone from the resulting transparent reaction product at 40 to 60° C. under reduced pressure, the concentration was adjusted by adding water to obtain a stable transparent colloidal water dispersion having a nonvolatile content of 20%.

Using the resulting water dispersion, aqueous coating agents A and B were prepared in the same manner as described above and various evaluations were performed. As a result, the resulting aqueous coating agents were insufficient in film forming properties and conformability to base material, as shown in Table 3-2, because the plasticization effect due to the hydrophobic polyol (B) is not exerted.

TABLE 3-1

| | Evaluation results of Examples | | | | |
| --- | --- | --- | --- | --- | --- |
| | Example 1 | Example 2 | Example 3 | Example 4 | Example 5 |
| Water-dispersible polyurethane resin (A) | | | | | |
| Polyester polyol P-1 (Parts) | 1000 | 1000 | | 1000 | 1000 |

TABLE 3-1-continued

Evaluation results of Examples

|  | Example 1 | Example 2 | Example 3 | Example 4 | Example 5 |
|---|---|---|---|---|---|
| Polyester polyol P-2 (Parts) |  |  | 1000 |  |  |
| 2,2'-dimethylolpropionic acid (Parts) | 80 | 80 |  | 80 | 80 |
| 1,4-butanediol (Parts) |  |  | 20 |  |  |
| Hydrogenated MDI[1)] (Parts) |  |  | 198 |  |  |
| Isophorone diisocyanate (Parts) | 281 | 281 |  | 281 | 281 |
| Polyisocyanate compound content | 20.6% | 20.6% | 16.3% | 20.6% | 20.6% |
| Content of aromatic cyclic structural unit of water-dispersible polyurethane resin (A) | 25.6% | 25.6% | 20.7% | 25.6% | 25.6% |
| Hydrophobic polyol (B) |  |  |  |  |  |
| Polyester polyol Q-1 (Parts) | 340 |  | 135 |  |  |
| Polyester polyol Q-3 (Parts) |  |  |  | 151 | 583 |
| Polyether polyol R (Parts) |  | 340 |  |  |  |
| Polyurethane resin (A)/Polyol (B) (weight ratio) | 80/20 | 80/20 | 90/10 | 90/10 | 70/30 |
| Film forming properties |  |  |  |  |  |
| 5° C. | A | A | A to B | A | A |
| 20° C. | A | A | A | A | A |
| Adhesive tape peeling test |  |  |  |  |  |
| PET adhesion |  |  |  |  |  |
| Aqueous coating agent A | 5 | 5 | 5 | 5 | 5 |
| Aqueous coating agent B | 5 | 5 | 5 | 5 | 5 |
| OPP adhesion |  |  |  |  |  |
| Aqueous coating agent A | 5 | 5 | 5 | 5 | 5 |
| Aqueous coating agent B | 5 | 5 | 5 | 5 | 5 |
| Conformability to base material | A | A | A | A | A |
| Blocking resistance | A | A | A | A | A |
| Solvent resistance | 5 | 4 | 5 | 5 | 4 |
| Water resistance | 5 | 4 | 5 | 5 | 4 |
| Ink adhesion | 5 | 5 | 5 | 5 | 5 |

Note
[1)]hydrogenated MDI: dicyclohexylmethane-4,4'-diisocyanate

TABLE 3-2

Evaluation results of Comparative Examples

|  | Comparative Example 1 | Comparative Example 2 | Comparative Example 3 | Comparative Example 4 | Comparative Example 5 |
|---|---|---|---|---|---|
| Water-dispersible polyurethane resin |  |  |  |  |  |
| Polyester polyol P-1 (Parts) |  | 1000 | 1000 | 1000 | 800 |
| Polyester polyol P-2 (Parts) |  |  |  |  |  |
| Polyester polyol P-3 (Parts) | 1000 |  |  |  |  |
| Polyester polyol Q-1 (Parts) |  |  |  |  | 200 |
| 2,2'-dimethylolpropionic acid (Parts) | 80 | 80 | 80 | 80 | 80 |
| 1,4-butanediol (Parts) |  |  |  |  |  |
| Hydrogenated MDI[1)] (Parts) |  |  |  |  | 385 |
| Isophorone diisocyanate (Parts) | 244 | 281 | 281 | 281 |  |
| Polyisocyanate compound content | 18.4% | 20.6% | 20.6% | 20.6% | 26.3% |
| Content of aromatic cyclic structural unit of water-dispersible polyurethane resin | 0.0% | 25.6% | 25.6% | 25.6% | 22.7% |
| Hydrophobicpolyol |  |  |  |  |  |
| Polyester polyol Q-1 (Parts) | 70 |  |  |  |  |
| Polyester polyol Q-2 (Parts) |  |  | 340 |  |  |
| Polyester polyol Q-4 (Parts) |  |  |  | 340 |  |
| Polyurethane resin (A)/polyol (B) (weight ratio) | 95/5 | 100/0 | 80/20 | 80/20 | copolymerized |
| Film forming properties |  |  |  |  |  |
| 5° C. | A | C | 2) | C | C |
| 20° C. | A | C |  | C | C |
| Adhesive tape peeling test |  |  |  |  |  |
| PET adhesion |  |  |  |  |  |
| Aqueous coating agent A | 1 | 5 |  | 5 | 5 |
| Aqueous coating agent B | 2 | 5 |  | 5 | 5 |

TABLE 3-2-continued

Evaluation results of Comparative Examples

| | Comparative Example 1 | Comparative Example 2 | Comparative Example 3 | Comparative Example 4 | Comparative Example 5 |
|---|---|---|---|---|---|
| OPP adhesion | | | | | |
| Aqueous coating agent A | 3 | 1 | | 1 | 2 |
| Aqueous coating agent B | 3 | 1 | | 2 | 2 |
| Conformability to base material | A | C | | C | C |
| Blocking resistance | B | A | | A | A |
| Solvent resistance | 1 | 5 | | 5 | 5 |
| Water resistance | 2 | 5 | | 5 | 5 |
| Ink adhesion | 1 | 5 | | 5 | 5 |

Note 2):
imppossible to perform water dispersion

INDUSTRIAL APPLICABILITY

The aqueous coating agent of the present invention has excellent processability in a wide temperature range and excellent adhesion to plastic films because of its excellent film forming properties at low temperature, and is also excellent in blocking resistance, water resistance, solvent resistance and transparency and, therefore, the aqueous coating agent is suited for use as a coating agent for plastic films, which are used in in-line coating and off-line coating methods. The aqueous coating agent can be widely used as a primer coating agent or anchor coating agent in the fields of food packaging films, decorative materials and metal deposited films, and also used as a coating composition, ink, and surface treating agent for fibers and leathers.

The invention claimed is:

1. An aqueous coating agent comprising:
   a water dispersion (C) prepared by dispersing resin particles containing a water-dispersible polyurethane resin (A) and at least one compound selected from a hydrophobic polyester polyol (B-1) and a hydrophobic polyether polyol (B-2) in water, and
   a crosslinking agent (D) capable of reacting with a hydroxyl group,
   wherein the water-dispersible polyurethane resin (A) is obtained by reacting a polyester polyol (a-1) which is obtained by condensing a dicarboxylic acid containing an aromatic dicarboxylic acid as a main component with a polyol, with a polyisocyanate, and also contains 15 to 35% by weight of an aromatic cyclic structural unit based on the weight of the water-dispersible polyurethane resin (A), and
   wherein the hydrophobic polyester polyol (B-1) and/or the hydrophobic polyether polyol (B-2) are liquid at normal temperature and contain 20 to 50% by weight of an aromatic cyclic structural unit.

2. The aqueous coating agent according to claim 1, wherein the total content of a urethane-bond unit and a urea-bond unit per 1000 g of the water-dispersible polyurethane resin (A) is within a range from 1.0 to 4.0 mols.

3. The aqueous coating agent according to claim 1, wherein the hydrophobic polyester polyol (B-1) is obtained by condensing a dicarboxylic acid with an aliphatic diol having 2 to 8 carbon atoms, and orthophthalic acid accounts for at least 60 mol % of the total amount of the dicarboxylic acid.

4. The aqueous coating agent according to claim 1, wherein the hydrophobic polyether polyol (B-2) is a propylene oxide adduct of a polynuclear phenol compound.

5. The aqueous coating agent according to claim 1, wherein the water-dispersible polyurethane resin (A) is obtained by reacting a polyester polyol (a-1), which is obtained by condensing a dicarboxylic acid with a polyol, with a polyisocyanate, and at least one compound selected from terephthalic acid and isophthalic acid accounts for 70 to 100 mol % of the total amount of the dicarboxylic acid.

6. The aqueous coating agent according to claim 1, wherein the water-dispersible polyurethane resin (A) and the hydrophobic polyester polyol (B-1) or the hydrophobic polyether polyol (B-2) are not substantially chemically-bonded.

7. The aqueous coating agent according to claim 1, wherein the crosslinking agent (D) is at least one kind selected from the group consisting of an amino resin and a polyisocyanate.

8. An aqueous coating agent comprising:
   a water dispersion (C) prepared by dispersing in water resin particles containing a water-dispersible polyurethane resin (A) and a hydrophobic polyester polyol (B-1); and
   a crosslinking agent (D) capable of reacting with a hydroxyl group;
   wherein the water-dispersible polyurethane resin (A) is obtained by reacting a polyester polyol (a-1) with a polyisocyanate, the polyester polyol (a-1) being obtained by condensing a dicarboxylic acid containing an aromatic dicarboxylic acid as a main component with a polyol; the water-dispersible polyurethane resin (A) contains 15 to 35% by weight of an aromatic cyclic structural unit based on the weight of the water-dispersible polyurethane resin (A); and, the hydrophobic polyester polyol (B-1) is liquid at normal temperature and contains 25 to 35% by weight of an aromatic cyclic structural unit.

9. An aqueous coating agent comprising:
   a water dispersion (C) prepared by dispersing in water resin particles containing a water-dispersible polyurethane resin (A) and at least one hydrophobic polyol (B) selected from a group consisting of a hydrophobic polyester polyol (B-1) and a hydrophobic polyether polyol (B-1); and
   a crosslinking agent (D) capable of reacting with a hydroxyl group;
   wherein the water-dispersible polyurethane resin (A) is obtained by reacting a polyester polyol (a-1) with a polyisocyanate, the polyester polyol (a-1) being obtained by condensing a dicarboxylic acid containing an aromatic dicarboxylic acid as a main component with a polyol; the water-dispersible polyurethane resin (A) contains 15 to 35% by weight of an aromatic cyclic structural unit based on the weight of the water-dispersible polyurethane resin (A); the hydrophobic polyester polyol (B-1) and/or hydrophobic polyether polyol (B-2) are liquid at normal temperature and contain 25 to 40% by weight of an aromatic cyclic structural unit.

10. The aqueous coating agent according to claim 1, wherein the hydroxyl value of the hydrophobic polyol (B) is within a range of 20 to 500.

11. The aqueous coating agent according to claim 1, wherein the hydroxyl value of the hydrophobic polyol (B) is within a range of 50 to 400.

12. The aqueous coating agent according to claim 1, wherein the mixing ratio (A)/(B) between the water-dispersible polyurethane resin (A) to the hydrophobic polyol (B) is within a range of 95/5 to 50/50.

13. The aqueous coating agent according to claim 1, wherein the mixing ratio (A)/(B) between the water-dispersible polyurethane resin (A) to the hydrophobic polyol (B) is within a range of 90/10 to 70/30.

14. The aqueous coating agent according to claim 1, wherein the number average molecular weight of the hydrophobic polyol (B) is within a range of 200 to 4000.

15. The aqueous coating agent according to claim 1, wherein the number average molecular weight of the hydrophobic polyol (B) is within a range of 250 to 2000.

* * * * *